Figure 1:
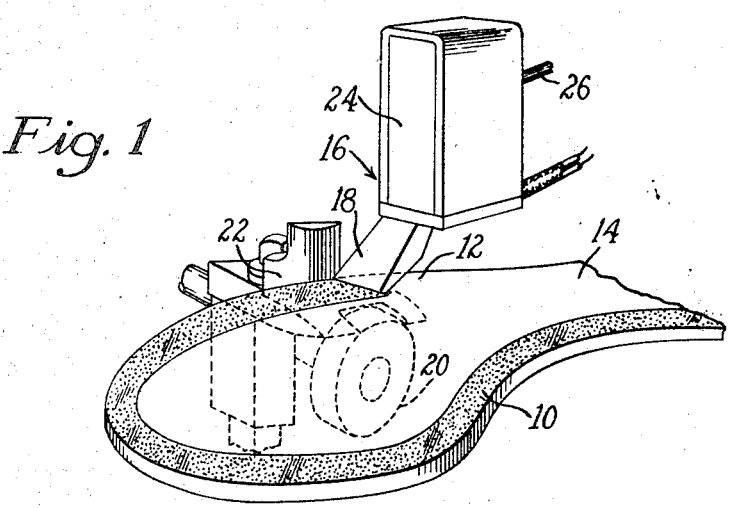
Figure 2:
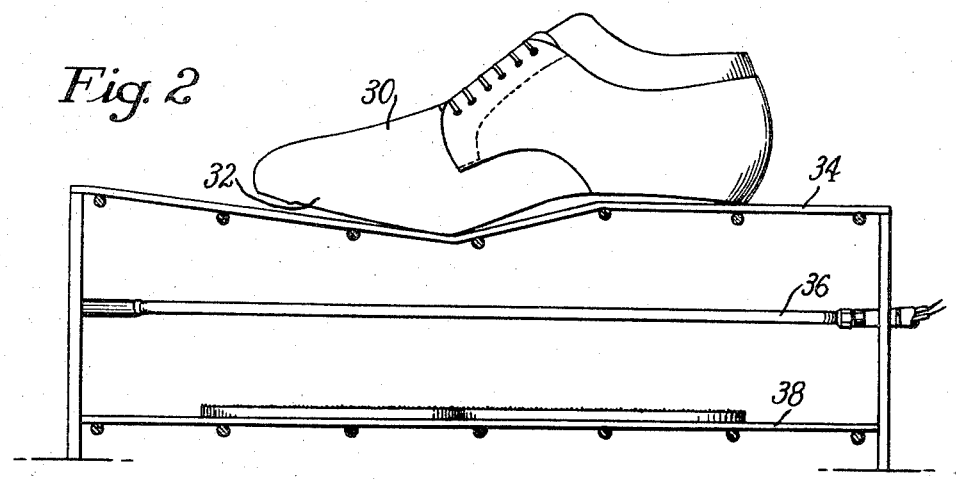
Figure 3:
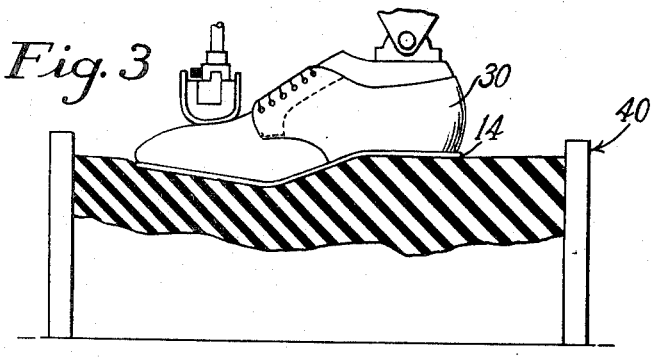

Feb. 9, 1965 C. ROSSITTO 3,168,754
METHOD OF ATTACHING AN OUTSOLE AND A SHOE
BOTTOM BY USING AN ADHESIVE
Filed June 30, 1961

Inventor
Conrad Rossitto
By his Attorney
Benjamin C. Pollard

United States Patent Office 3,168,754
Patented Feb. 9, 1965

3,168,754
METHOD OF ATTACHING AN OUTSOLE AND A SHOE BOTTOM BY USING AN ADHESIVE
Conrad Rossitto, Andover, Mass., assignor to United Shoe Machinery Corporation, Boston, Mass., a corporation of New Jersey
Filed June 30, 1961, Ser. No. 121,118
5 Claims. (Cl. 12—142)

This application relates to adhesive processes and particularly processes for the adhesive attachment of soles to shoe uppers.

The adhesive attachment of outsoles to shoe uppers has in large measure involved applying adhesive as a volatile organic solvent solution to both the outsole and shoe upper. The solvent was allowed to evaporate and ordinarily the dried adhesive films were subjected to heat before outsole and upper were pressed together. The solvent type adhesives were satisfactory in their ability to wet and penetrate the surfaces to be bonded; and shoes prepared using such adhesives have been acceptable. However, the use of solvent type adhesives introduces a time delay for the drying of the deposited adhesive and a definite fire hazard both in the adhesive solution and in the solvent vapors given off from the deposited adhesive.

In other fields than sole attaching, the so called hot melt adhesive processes have been found useful. However, attempts to bond outsoles to uppers using the known hot melt adhesive processes gave inadequate bonds, apparently because of unsatisfactory penetration and/or wetting of the surfaces to be bonded.

It is an object of the present invention to provide an adhesive and adhesive process combining excellent penetration and/or wetting of surfaces to be bonded and a strong final bond while avoiding the time delays and fire hazards of solvent adhesives.

To this end and in accordance with a feature of the present invention, an at least partially radiant heat transparent band thermoplastic adhesive is deposited in at least lightly adhered relation on the surface of a body to be adhered. Thereafter, radiant heat is directed at the band to heat the underlying body and to soften the adhesive. Subsequent pressure on the adhesive band, as in assembly of the body with a second body, produces good wetting and/or penetration.

Sole attaching by means of adhesives presents special problems. Preparation of a firm base on an outsole adapted for effective union with adhesive ordinarily involves a "roughing operation." The upper also is irregular due to pleating, for example—at the toe, and to the tacks or other holding devices. The solids concentration of solvent type adhesives ordinarily is not over about 30% to 40%, and the quantity of adhesive solids which can be deposited in a single operation is limited in practice by the drying time which increases as the thickness of the layer of deposited adhesive increases. In general, because of the irregularity of the surfaces of outsoles and uppers to be joined together, there are provided at least one adhesive coat on the upper and one adhesive coat on the outsole to provide the quantity of adhesive needed for joining such surfaces. A further difficulty arises from the problems of applying adhesive to only those portions of a shoe upper which will be in engagement with the outsole so that unsightly adhesive coated areas of the shoe upper are not visible.

It is a further object of the present invention to provide an adhesive sole attaching process in which adhesive need be applied to only one surface, preferably the surface of the sole.

To this end and in accordance with a further feature of the present invention, a band of adhesive based on thermoplastic substantially linear polymer resin is deposited on the attaching marginal areas of a sole, in at least lightly adherent relation to the sole. Thereafter, the band of adhesive and the underlying sole material are heated by infrared radiation to soften the adhesive and provide a store of sensible heat in the sole material. The bottom of the shoe upper is also heated and is assembled against the heated sole. When these are strongly pressed together the softened adhesive is forced into wetting and/or penetrating engagement with the shoe upper and the sole, the effectiveness of this step depending upon the heat of the shoe upper and sole to maintain the adhesive fluid. Pressure is released with only a minimum holding time after the sole and the shoe upper have been forced together. Separation of the outsole from the shoe upper is prevented by the rapid setting adhesive and the flow retarding action of the geometry of the spaces between the upper and the sole.

The invention will be described further in connection with the attached drawings forming part of the disclosure in the present case in which:

FIG. I is a diagrammatic angular view with parts broken away of a modified outsole cementer disposing a band of adhesive on the attaching margin of an outsole;

FIG. II is a diagrammatic elevational view showing heat radiation of the adhesive band and outsole and the heating of the bottom of a shoe upper; and FIG. III is a diagrammatic elevational view showing the bonding of an outsole to an upper in a sole attaching press.

An important factor in the successful operation of the present process is the deposition on the surface of a body to be adhered of an at least partially radiant heat-transparent band of thermoplastic adhesive on the surface of a body to be adhered. The development of a strong bond by this adhesive after radiant heating and bringing together of surfaces to be adhered is dependent in considerable measure on the successful penetration and/or thorough wetting of the surface portions. Supply of penetrating heat to the surface and portions of the body underlying the adhesive is important to provide a store of sensible heat adjacent the adhesive to maintain the adhesive in heat softened condition for useful periods of time. Additionally, the heated underlying portions of the body do not gel or solidify the adhesive when the adhesive is forced into contact with those portions in the pressure stage of the adhesive bonding process. The transparency of the adhesive band to radiant heat is dependent on the nature of the adhesive and on the band being relatively thin. A further important characteristic of the band is its at least slight adhesion to the surface of the body since this adhesion prevents the tendency of the adhesive to contract into a bead when subjected to heating. Also, the adhesion insures effective heat transfer relation between the adhesive band and the surface of the body.

Deposition of such a band of thermoplastic adhesive in the desired relationship is most effectively provided by extruding and spreading molten adhesive on the surface of the body where is is cooled and solidified in the desired relation.

It is also possible to provide such a band by other procedures such as depositing a band of finely divided adhesive which is rendered tacky and lightly adhesive by heat.

An illustrative procedure to aid in understanding the operation of the invention is the process of cement outsole attaching in which a band 10 of molten thermoplastic adhesive is spread on the attaching margin 12 of an outsole 14 by a modified outsole cementer 16, as shown in FIG. I. The outsole cementer 16 comprises a nozzle 18 for applying and spreading the adhesive, a drive wheel 20 for moving the outsole 14 at a desired rate past the nozzle 18, and a guide 22 for maintaining the margin 12 of the outsole 14 in desired relation to the nozzle 18. In the device shown, molten cement for the nozzle 18 is supplied from a melting device 24 for handling a rod or strand 26 of thermoplastic adhesive; but it is to be understood that other molten adhesive supplies may be used where the nature of the adhesive permits.

As shown in FIG. I, the cementer 16 applies a band 10 extending around at least the forward portion of the outsole 14 and it may extend around the entire margin of the outsole depending on the shoe construction involved. The deposited band 10 of adhesive is relatively thin and may be of the order of about 0.005 to about 0.05 inch, preferably 0.010 to 0.020 inch. While certain portions of this range of thickness of adhesive may not differ greatly from the thicknesses of bands of adhesive solution heretofore used in outsole cementing, the present solvent-free band of adhesive contains a significantly greater quantity of adhesive per unit thickness since it is 100% solids and is not diminished by the evaporation of volatile solvents.

The molten adhesive band 10 applied to the sole cools and solidifies rapidly due to the temperature and heat capacity of the sole material so that ordinarily only minor or superficial penetration of a leather outsole occurs, and substantially the entire volume of adhesive remains as a flat band 10 localized at the surface of the outsole 14. It has been found that the applied adhesive band 10 is usually only lightly adherent and is strippable as a self-supporting film, i.e., is provisionally attached so that in the event of a malfunction of the device or of some other factor, the adhesive band 10 may be readily removed and the outsole 14 given a second treatment to provide the desired adhesive band. The adhesive coated outsoles 14 may be stacked substantially immediately after being coated because of the rapid solidification of the adhesive; and this factor is of considerable importance since it eliminates the need for drying racks and drying time necessary with solvent adhesive coated outsoles.

The thermoplastic adhesive useful for outsole attaching, according to the present method, involves a special combination of physical characteristics for effective operation. In general, the adhesive must be thermoplastic at least to the extent that it does not set up prior to completion of the two heating operations involved in the present process. Resins which have been found useful include the polyesters from reaction of dicarboxylic acids and glycols, polyester amides, for example adipic polyesteramides in which the hydroxy component is 1,6 hexanediol, 1,4 butanediol or ethylene glycol, stereo-specific catalyzed polymers of vinyl alkyl ethers where the alkyl group has from 1 to 4 carbon atoms, polymers and copolymers of lower alkyl acrylates and methacrylates. Resins having molecular weights preferably not over about 50,000 have been preferred in order that they may have the necessary fluidity for spreading, wetting and penetration. Mixtures of polymeric materials having molecular weights above this value, with resins of lower molecular weight may be compounded to approximate the physical properties of the preferred resins for use in the present process. It has been found desirable that the adhesive having a relatively wide temperature range, referably a range of at least 20° C. in which it is visco-elastic when cooled from molten condition. The term visco-elastic refers to a condition in which the adhesive is somewhat rubbery but deformable and flowable under pressure, in order that it may avoid excessive "squeeze-out" under the high pressures involved in sole attatching while at the same time permitting limited movement, for example of the outsole 14 relative to an upper 30 so that accurate positioning of the outsole 14 relative to the upper 30 may be assured even after the outsole has come in contact. The temperature range in which the visco-elastic condition in the preferred adhesive occurs may be from about 10° C. to about 60° C. below the melting point of the adhesive; and the adhesive will harden to a strong, tough condition at temperatures at least as high at 50° C. Other important properties are relatively high strength, toughness and at least limited flexibility at room temperature in order that the adhesive may successfully withstand the severe stresses encountered in the use of a shoe.

A useful class of adhesives is that of the polyesters, for example, terephthalates, isophthalates, sebacates, succinates, etc. Preferred polyesters include condensates of a lower alkylene glycol such as ethylene glycol or butylene glycol with dicarboxylic acids, for example, condensates of 1,4 butanediol with mixed terephthalate and isophthalate components in the molar ratio of from about 1 to 1 to about 4 to 1 and condensates of mixed ethylene glycol and 1,4 butanediol and mixtures of these with mixed terephthalate, isophthalate and sebacate components in percentages of 40% to 60% terephthalate, 20% to 50% isophthalate and 10% to 20% sebacate.

These polyesters are prepared by condensation to have melting points of from 80° to 200° C.

Other adhesives useful in this process for the adhesive attachment of soles to shoe uppers are described in my copending application Serial No. 121,117, filed June 30, 1961 entitled Thermoplastic Adhesive, Process and Article.

Completion of the sole attaching process involves heating of the sole attaching surface 32 of the upper 30 by any conventional means, usually by disposing the upper 30 on a rack 34 spaced from the radiant heating unit 36 employed for action on the outsole 14. The outsole 14 is positioned on a rack 38 relative to the radiant heating unit 36 so that the radiant heat falls on the adhesive band or film 10. The band of film 10 of adhesive is at least partially transparent to the radiant heat so that a substantial proportion of the heat passes through the adhesive and is absorbed by the outsole material underlying the adhesive to effect a deep heating of the outsole material. As a matter of fact, measurements of temperatures reached after radiant heating in surface portions of a leather outsole beneath such a band of adhesive and surface portions not beneath such a band gave a temperature more than 50° F. higher for the portions beneath the band than for surface portions not beneath the band. Without attempting to explain this phenomenon, it would appear that this unexpected and unobvious action may be partially responsible for the effective bonding obtained. Also, it is observed that a film of adhesive in the lightly adhered relation to the outsole material is softened and activated more rapidly than a film of adhesive not so adhered. It is also found that the adherence is important since it holds the adhesive film in extended condition and does not allow the beading up through surface tension of adhesive film merely laid on a surface.

After heating of the bottom 32 of the shoe upper 30 and radiant heating of the film of adhesive 10 and portions of the outsole 14 underlying the film, the outsole 14 is positioned on the bottom 32 of the shoe upper 30. The adhesive film 10 although somewhat rubbery in its heated condition, has a visco-elastic nature which allows at least limited sliding of the outsole 14 relative to the shoe upper 30. Also, the heated portions of outsole material underlying the adhesive constitute a store of sensible heat so that great rapidity of assembling the outside and upper is not essential.

After positioning of the outsole on the bottom of the shoe upper, the assembled shoe upper 30 and outsole 14 are placed in a sole attaching press 40 (see FIG. III) and subjected to sole attaching pressure. Surprisingly, notwithstanding the amount of time which is available for assembling of the outsole and upper, pressure in the sole attaching press 40 may be released in a matter of only a few seconds. The ability of the adhesive to hold the outsole 14 firmly on the shoe upper 30 after so short a time is due in some measure to the fact that the deeply heated outsole portions permit excellent penetration of the molten adhesive, i.e., do not chill penetrating portions of the adhesive to constitute a block against further penetration. This excellent penetration and/or wetting of the outsole and shoe upper by the adhesive reduce the thickness of the adhesive between outsole and upper and when sole attaching pressure is applied create a geometry between the outsole and shoe upper in which the adhesive may function most effectively.

A further factor which is particularly valuable in the bonding of plasticized vinyl resin soles is that the deep heating of the outsole and upper create a condition in which resins such as polyesters may at least partially crystallize. The crystallized resin adhesives are less soluble in plasticizers and hence the adhesive band is less subject to weakening by plasticizer from vinyl resin soles.

The above explanation of the desirable action of the adhesive is given as of possible assistance in understanding the invention; but it is to be understood that patentability is not based on the correctness of the theory advanced.

The process has been described as it applies to the bonding of a leather outsole to a shoe upper using a single layer of adhesive. In some relations, for example with some commercial, natural or synthetic rubber outsole materials, it has been found desirable to provide a primer coat on the attaching surface of the outsole to improve the union between the thermoplastic adhesive and the outsole. It is to be remembered, however, that even where such a primer is indicated, many of the advantages of the present process are still secured, since it is not necessary to apply adhesive to the bottom of the shoe upper and the danger of contamination of portions of the shoe upper which will be exposed in use is avoided since the adhesive for sole attaching is only on the outsole.

Primers for natural or synthetic rubber outsoles may be a solution of chlorinated rubber in a volatile organic solvent or may be a relatively stable polyisocyanate, for example a polyarylene polyisocyanate commercially available as "PAPI."

The following examples are given for assistance in understanding the invention. The invention is not restricted to the particular materials, proportions or procedural conditions employed in the examples.

*Example 1.*—A polyester was prepared by the reaction and condensation of 1,4 butane diol and isophthalic acid to form a resinous material having a melting point of about 104° C. to 109° C. (Ring and Ball) and having a rubbery but deformable and flowable character at temperatures from about 75° C. to about 95° C.

The rod of resinous cement was fed to a melting device disposed to provide molten adhesive to an outsole cementer. The melting device and the cementer were adjusted to deliver molten resinous material to the surface of a leather outsole at 350° F., and the sole feeding device and nozzle were adjusted to deposit a band of adhesive 10 mils. thick and ½ in. wide on the attaching marginal surface of a leather outsole. The band of resin solidified promptly after deposition so that successive outsoles could be piled one on another directly after deposition of the resin band.

A leather outsole was disposed with the resin band towards a radiant heat source for 15 seconds. This radiant heat raised the surface temperature of the leather to about 150° to 175° F.; and raised the temperature of the deposited resin band to an extent that the resin became fluid and wet the surface of the leather. Exact temperatures of the resin band could not be determined but appeared to be 235°–240° F.

The bottom of a shoe upper was exposed to radiant heat to raise the temperature of the attaching surface of the shoe upper to about 120° to 140° F. The outsole was then "spotted" on the upper and the assembly placed in a sole attaching press. Pressure was applied to the extent of 200 to 225 lbs. total pressure on the assembly, and after 10 seconds the pressure was removed. On examination it was found that the sole was strongly attached to the shoe upper, that the edges of the sole were very "tight" to the upper and that there had been no squeeze out of adhesive.

*Example 2.*—Ethylene glycol and 1,4 butane diol in the molar ratio of 25 to 75 were esterified with isophthalic acid and the ester polymerized to form a resinous copolyester having melting point of about 101° to 105° C.

This resinous material was used for outsole attaching following the procedure set forth in Example 1 and gave a strongly attached outsole.

*Example 3.*—A polyester was prepared by the reaction and condensation of 1,4 butane diol and equimolar proportions of dimethyl terephthalate and isophthalic acid. Condensation was carried out to form a resinous material having a melting point of about 142° C. (Ring and Ball).

This resin was formed into a rod and used for attaching leather soles to shoe uppers using the procedure and conditions set forth in Example 1. It was found that the outsoles were strongly and tightly attached to the shoe uppers.

*Example 4.*—A polyester was prepared by the reaction and condensation of ethylene glycol with a mixture comprising in terms of mol percentages 60% of dimethyl terephthalate, 20% isophthalic acid and 20% sebacic acid. Condensation was carried to the extent of providing a melting point of 170° C. (Ring and Ball). This resin was formed into a rod and used for attaching leather soles to shoe uppers, using the procedure and conditions set forth in Example 1 but delivering the molten resinous material at a temperature of about 375° F. The sole was found to be strongly and tightly attached to the shoe upper.

Having thus described my invention, what I claim as new and desire to secure by Letters Patent of the United States is:

1. The process of hot melt cement attaching an outsole and a shoe bottom which comprises depositing substantially solvent-free thermoplastic synthetic polymer resin adhesive in molten condition on the outsole only as a discrete ribbon at least lightly adherent upon marginal surface portions of the outsole and cooling the ribbon to render it self-supporting, subsequently heating the ribbon and the portions of the outsole underlying it to restore the adhesive to molten fluid condition for wetting engagement with surfaces to be bonded and to prepare the underlying sole area for permanent adhesive attachment, concurrently heating the bottom portion of the shoe to which the outsole is to be attached, then bringing the shoe bottom and outsole together with the ribbon of molten adhesive between them and exerting pressure to force the adhesive into wetting engagement with the heated surfaces of both the outsole and shoe bottom, and finally cooling the adhesive to establish rapidly a strong permanent sole attaching bond between the outsole and the shoe bottom.

2. The process of hot melt cement attaching a shoe sole and a shoe bottom which consists essentially in depositing substantially solvent-free thermoplastic synthetic polymeric resin adhesive in molten condition on the outsole only as a discrete ribbon at least lightly adherent upon marginal portions of the sole and cooling the ribbon to render it self supporting, subsequently subjecting the ribbon and the portions of the outsole underlying it to radiant heat to restore the adhesive to molten fluid condition for wetting engagement with surfaces to be bonded and to prepare the underlying sole area for permanent adhesive attachment, concurrently heating the bottom portion of the shoe to which the outsole is to be attached, then bringing the shoe bottom and outsole together with the ribbon of molten adhesive between them and exerting pressure to force the adhesive into wetting engagement with the heated surfaces of both the outsole and shoe bottom, and finally cooling the adhesive to establish rapidly a strong permanent sole attaching bond between the outsole and the shoe bottom.

3. The process of hot melt cement attaching a shoe sole and a shoe bottom which consists essentially in depositing substantially solvent-free thermoplastic synthetic polymeric resin adhesive in molten condition on the outsole only as a discrete ribbon from 0.005 to 0.05 inch in thickness upon marginal portions of the sole and cooling the ribbon to render it self-supporting whereby the ribbon is carried by and at least lightly adhered to the outsole surface, subsequently subjecting the ribbon and the portions of the outsole underlying it to radiant heat to restore the adhesive to molten fluid condition for wetting engagement with surfaces to be bonded and to prepare the underlying sole area for permanent adhesive attachment, concurrently heating the bottom portion of the shoe to which the outsole is to be attached, then bringing the shoe bottom and outsole together with the ribbon of molten adhesive between them and exerting pressure to force the adhesive into wetting engagement with the heated surfaces of both the outsole and shoe bottom and finally cooling the adhesive to establish rapidly a strong permanent sole attaching bond between the outsole and the shoe bottom.

4. The process of hot melt cement attaching a shoe sole and a shoe bottom which consists essentially in depositing substantially solvent-free thermoplastic synthetic polymeric resin adhesive in molten condition on the outsole only as a discrete ribbon 0.005 to 0.05 inch in thickness upon marginal portions of the sole and cooling the ribbon to render it self-supporting whereby the ribbon is carried by and lightly adhered to the outsole surface, said resin having a melting point in the range of from about 80° C. to about 300° C. and said adhesive hardening to a strong tough condition at temperatures of at least 50° C., subsequently subjecting the ribbon and the portions of the outsole underlying it to radiant heat to restore the adhesive to molten fluid condition for wetting engagement with surfaces to be bonded and to prepare the underlying sole area for permanent adhesive attachment, concurrently heating the bottom portion of the shoe to which the outsole is to be attached, then bringing the shoe bottom and outsole together with the ribbon of molten adhesive between them and exerting pressure to force the adhesive into wetting engagement with the heated surfaces of both the outsole and shoe bottom, and finally cooling the adhesive to establish rapidly a strong permanent sole attaching bond between the outsole and the shoe bottom.

5. The process of hot melt cement attaching a shoe sole and a shoe bottom which consists essentially in depositing substantially solvent-free thermoplastic synthetic polymeric resin adhesive in molten condition on the outsole only as a discrete ribbon from 0.005 to 0.05 inch in thickness upon marginal portions of the sole and cooling the ribbon to render it self-supporting whereby the ribbon is carried by and adhered to the outsole surface, said resin being a polyester condensate of a lower alkylene glycol with a dicarboxylic acid and having a melting point in the range of from about 80° C. to about 200° C. and said adhesive hardening to a strong tough condition at temperatures of at least 50° C., subsequently subjecting the ribbon and the portions of the outsole underlying it to radiant heat to restore the adhesive to molten fluid condition for wetting engagement with surfaces to be bonded and to prepare the underlying sole area for permanent adhesive attachment, concurrently heating the bottom portion of the shoe to which the outsole is to be attached, then bringing the shoe bottom and outsole together with the ribbon of molten adhesive between them and exerting pressure to force the adhesive into wetting engagement with the heated surfaces of both the outsole and shoe bottom and finally cooling the adhesive to establish rapidly a strong permanent sole attaching bond between the outsole and the shoe bottom.

References Cited in the file of this patent
UNITED STATES PATENTS

| | | |
|---|---|---|
| 2,196,856 | Dudenhofen | Apr. 9, 1940 |
| 2,385,523 | Marasco | Sept. 25, 1945 |
| 2,426,268 | Hart | Aug. 26, 1947 |
| 2,744,087 | Snyder | May 1, 1956 |
| 2,794,794 | Schlatter et al. | June 4, 1957 |
| 2,907,058 | Evins | Oct. 6, 1959 |
| 3,021,543 | Crowley | Feb. 20, 1962 |
| 3,056,984 | Snitzer | Oct. 9, 1962 |